United States Patent [19]
Abe et al.

[11] Patent Number: 4,993,805
[45] Date of Patent: Feb. 19, 1991

[54] COMPOSITE OVERHEAD CABLE STRUCTURE HAVING HIGH SEAL PROPERTIES AND A PROCESS FOR PRODUCING THE SAME

[75] Inventors: Kazuya Abe, Sakura; Toshiya Shinozaki, Tokyo; Masaru Akinaga, Funabashi, all of Japan

[73] Assignee: Fujikura Ltd., Tokyo, Japan

[21] Appl. No.: 531,369

[22] Filed: May 31, 1990

[51] Int. Cl.⁵ .............................................. G02B 6/44
[52] U.S. Cl. .................................. 350/96.23; 72/367; 174/70 R; 228/145
[58] Field of Search .................. 350/96.23; 174/70 R; 72/367, 368, 369; 228/173.4, 173.5, 176, 145

[56] References Cited

U.S. PATENT DOCUMENTS

| | | | |
|---|---|---|---|
| 4,491,387 | 1/1985 | Dey et al. | 350/96.23 |
| 4,504,112 | 3/1985 | Gould et al. | 350/96.23 |
| 4,723,832 | 2/1988 | Okazato et al. | 350/96.23 |
| 4,775,213 | 10/1988 | Kitayama | 350/96.23 |
| 4,801,192 | 1/1989 | Wehner | 350/96.23 |
| 4,878,733 | 11/1989 | Winter et al. | 359/96.23 |

FOREIGN PATENT DOCUMENTS

| | | |
|---|---|---|
| 50-143775 | 11/1975 | Japan . |
| 50-143776 | 11/1975 | Japan . |
| 62-207518 | 9/1987 | Japan . |

Primary Examiner—John D. Lee
Attorney, Agent, or Firm—Armstrong, Nikaido, Marmelstein, Kubovcik & Murray

[57] ABSTRACT

Disclosed is a composite overhead cable structure having high seal properties, comprising a metallic pipe, at least one layer of stranded metallic elongated conductor surrounding the outer periphery of the pipe, and an optical fiber cable disposed within and extending throughout the length of the pipe, wherein the metallic pipe comprises at least two metallic pipe sections which are arranged in alignment and connected at their respective confronting terminals having contours complementary to each other and wherein the metallic pipe has a specific structure of connection between the mutually adjacent pipe sections, such that a longitudinal through-weld extends along the entire length of the metallic pipe and such that a connecting turning weld extends between first and second different points on the longitudinal through-weld of the metallic pipe so as to turn around the axis of said metallic pipe, the first and second points being positioned at a distance which satisfies a specific relationship. The welded metallic pipe has no weld defects in the longitudinal through-weld thereof so that the metallic pipe has excellent seal properties and therefore, the composite overhead cable structure of the present invention is free from the danger that rain water or the like enters the pipe and adversely affects the optical fiber cable.

6 Claims, 5 Drawing Sheets

COMPOSITE OVERHEAD CABLE STRUCTURE HAVING HIGH SEAL PROPERTIES AND A PROCESS FOR PRODUCING THE SAME

BACKGROUND OF THE INVENTION

1. Field Of The Invention

The present invention relates to a composite overhead cable structure for electric and optical transmission, containing a welded metallic pipe and an optical fiber cable disposed therein, and a process for producing the same. More particularly, the present invention is concerned with a composite overhead cable structure for electric and optical transmission, comprising a metallic pipe, at least one layer of stranded metallic elongated conductor surrounding the outer periphery of said pipe in close contact with said outer periphery, and an optical fiber cable disposed within and extending throughout the length of said pipe, wherein said metallic pipe comprises at least two metallic pipe sections arranged in alignment and connected at their respective confronting terminals having contours complementary to each other, and has a unique structure of weld connection between the mutually adjacent metallic pipe sections, so that high seal properties are imparted to the composite overhead cable structure. The above metallic pipe has no weld defects in the longitudinal weld thereof, thereby enabling the metallic pipe to be free from the danger that rain water or the like enters the pipe and adversely affects the optical fiber cable disposed therein. The present invention is also concerned with a process for producing the above-mentioned composite overhead cable structure for electric and optical transmission.

2. Discussion Of Related Art

Figure 1:
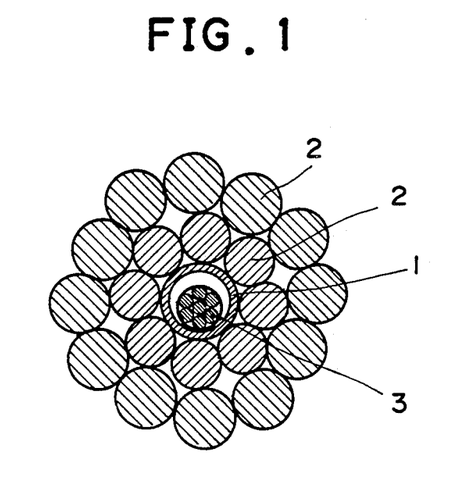
FIG. 1 is a diagrammatic cross-sectional view of one form of a composite overhead cable structure of the present invention.
Figure 2:
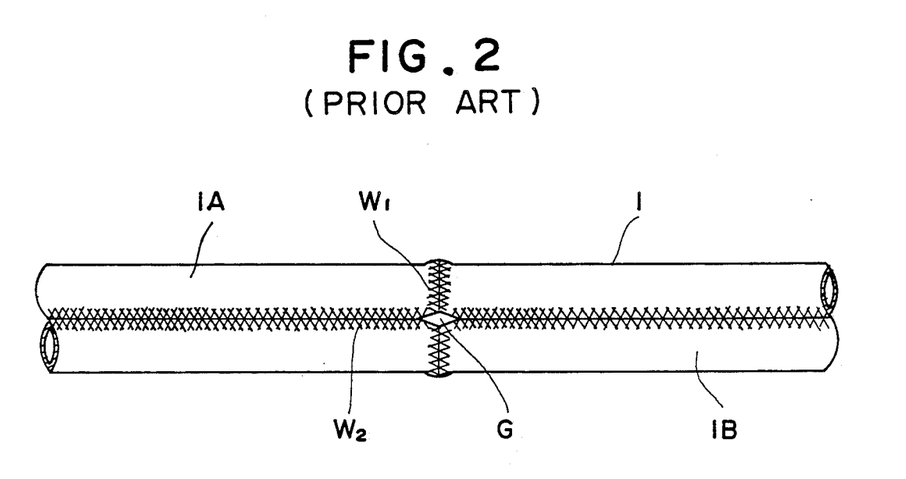
FIG. 2 is a partial diagrammatic view of a welded metallic pipe employed in the conventional composite overhead cable structure.

Heretofore, there have been known composite overhead cable structures for electric and optical transmission in which an optical fiber cable and an overhead cable are combined with each other. FIG. 1 shows the cross-section of one example of such composite overhead cable structures for electric and optical transmission. In the composite overhead cable structure of FIG. 1, metallic pipe 1 generally having a wall thickness of 1 to 2.5 mm and an outer diameter of 5 to 12 mm and made of aluminum or the like is disposed within stranded conductor 2 which functions as a ground wire. An optical fiber cable 3 is disposed inside metallic pipe 1. The welded metallic pipe employed in the conventional overhead cable structure is shown in FIG. 2. Metallic pipe 1 of FIG. 2 contained in the conventional composite overhead cable structure is prepared from metallic tape 1' of FIG. 3.

Figure 3:
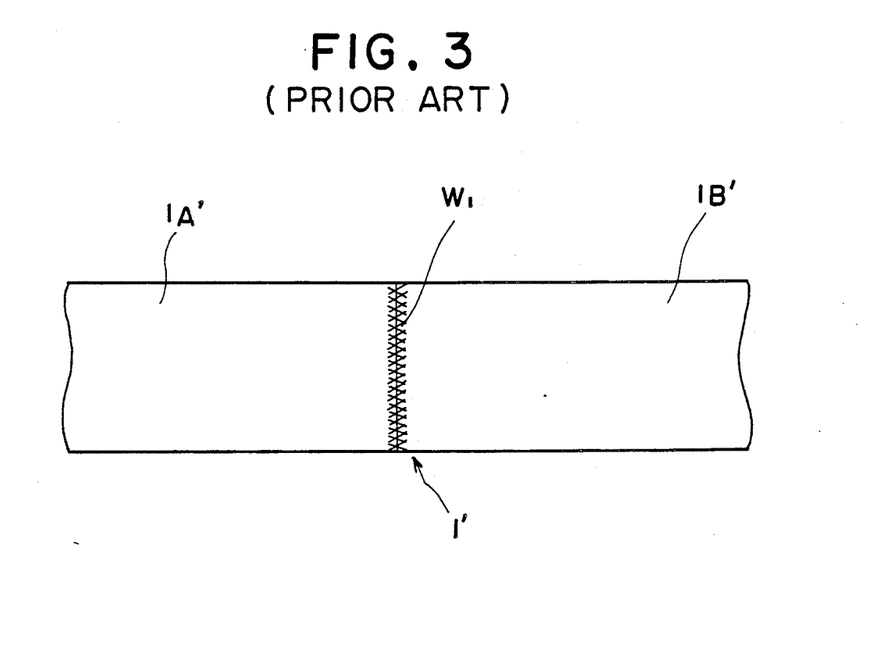
FIG. 3 is a partial diagrammatic view of an extended metallic tape, composed of two tapes welded together, which is to be used for forming the welded metallic pipe of FIG. 2.

A composite overhead cable structure having the structure as shown in FIG. 1 is generally produced by the steps of (1) bending metallic tape 1' of FIG. 3 having a thickness of 0.8 to 2 mm into a substantially cylindrical shape successively from one terminal of the metallic tape to the other terminal so that opposite longitudinal side edges of the metallic tape are brought into abutment against each other to form a substantially cylindrical preliminary pipe, while inserting an optical fiber cable into the substantially cylindrical preliminary pipe being formed from metallic tape 1', (2) welding together the longitudinal side edges, which have been brought into abutment, of the preliminary pipe, (3) squeezing the resultant metallic pipe through a die or the like to extend the pipe while reducing the diameter of the pipe, thereby obtaining a metallic pipe having the optical fiber cable disposed therein, and (4) stranding a metallic elongated conductor around the outer periphery of the metallic pipe.

As is understood from the production process described above, the length of a composite overhead cable structure depends on the lengths of the materials, namely, the optical fiber cable, metallic elongated conductor and metallic tape (to be used for forming the metallic pipe). At present, the available lengths of a metallic conductor and an optical fiber cable are at most 50 km and 7 to 8 km, respectively. With respect to a metallic tape, the available length is at most 4 km. The unit length of a composite overhead cable structure is determined depending on the length of the material having a length which is shortest among all the materials, namely, the length of the metallic tape (at most 4 km). In recent years, however, according to the progress of networking using optical transmission, the demand for composite overhead cable structures having increased lengths has been increased. For example, in the United States, a length as large as 6 km or more has been desired for composite overhead cable structures.

For providing composite overhead cable structures having increased lengths, it is necessary that a plurality of metallic tapes be welded together at their terminals to form an extended tape having a desired length.

With respect to the conventional method for welding the terminals of metallic tapes for obtaining an extended metallic tape having a length as large as 6 km or more, an explanation is made below, referring to FIGS. 2 and 3. Two metallic tapes 1A' and 1B' are welded at their terminals each having a contour of a straight line vertically extending between both edges of the tape. The formed weld is designated by $W_1$ in FIG. 3. However, with respect to the thus welded metallic tape 1', there is a problem such that when the welded metallic tape 1' consisting of metallic tapes 1A, and 1B, is bent into a substantially cylindrical shape so that opposite longitudinal side edges of the bent tape abut each other and welded at the longitudinal side edges to obtain a metallic pipe, defective welding is likely to occur between the longitudinal side edges at a point where longitudinal weld $W_2$ crosses circumferential weld $W_1$, thereby forming gap G, as shown in FIG. 2.

The reason for the occurrence of defective welding at the point where longitudinal weld $W_2$ crosses circumferential weld $W_1$ is as follows. When metallic tape 1' is bent into a substantially cylindrical shape, both ends of weld $W_1$ of extended tape 1' are caused to meet each other. However, since the stiffness of weld $W_1$ is greater than the stiffness of other portions of metallic tape 1', the bending of metallic tape 1' into a substantially cylindrical shape to form a pipe cannot be completely performed at weld $W_1$, causing the abutment of both the ends of weld $W_1$ to be poor. Consequently, even when it is tried to effect welding along the longitudinal side edges of the bent tape so as to form weld $W_2$, both the ends of weld $W_1$ which are in poor contact with each other cannot be completely welded together, leaving gap G, as shown in FIG. 2. That is, the so-called cross-welding as shown in FIG. 2 cannot provide complete welding at the cross-point.

In the conventional composite overhead cable structure using a metallic pipe having the abovementioned weld defects, i.e., gap G, it is likely that rain water or the like disadvantageously enters the metallic pipe through the gap and adversely affects the optical fiber cable housed therein, leading to a lowering of transmission properties of the optical fibers in the optical fiber cable.

SUMMARY OF THE INVENTION

The present inventors have made extensive and intensive studies with a view to developing a composite overhead cable structure which is free from the above-mentioned drawbacks inevitably accompanying the conventional composite overhead cable structure using the above-mentioned conventional cross-welded metallic pipe. As a result, it has been unexpectedly found that a metallic pipe comprising at least two metallic pipe sections and having a specific structure of weld connection between the mutually adjacent metallic pipe sections imparts high seal properties to the composite overhead cable structure. Therefore, a novel composite overhead cable structure employing such a welded metallic pipe can be advantageously utilized without the danger that rain water or the like enters the metallic pipe from a gap caused by defective welding to adversely affect an optical fiber cable disposed therein. The present invention has been completed based on the above novel finding.

It is, therefore, an object of the present invention to provide a novel composite overhead cable structure for electric and optical transmission which can be utilized without the danger of permeation of rain water or the like into the metallic pipe housing therein an optical fiber cable.

Another object of the present invention is to provide a process for producing such a novel composite overhead cable structure.

The foregoing and other objects, features and advantages of the present invention will be apparent from the following detailed description and appended claims taken in connection with the accompanying drawings.

In FIGS. 1 through 10, like parts or portions are designated by like numerals or characters.

DETAILED DESCRIPTION OF THE INVENTION

In one aspect of the present invention, there is provided a composite overhead cable structure for electric and optical transmission, comprising:

a metallic pipe having a substantially circular cross-section taken along a line perpendicular to the axis of said pipe, at least one layer of stranded metallic elongated conductor surrounding the outer periphery of said metallic pipe in close contact with said outer periphery, and an optical fiber cable disposed within and extending throughout the length of said metallic pipe, said metallic pipe comprising at least two metallic pipe sections each having in its wall a longitudinal weld extending in a lengthwise direction of the pipe section, said at least two metallic pipe sections being arranged in alignment so that the longitudinal welds thereof are aligned, the pipe sections which are disposed in adjacent relationship being connected at their respective confronting terminals having contours complementary to each other, wherein each confronting terminal comprises a complementary, terminal longitudinal portion extending, in a lengthwise direction of the pipe section, from the terminal point of said longitudinal weld of the pipe section on the side of said confronting terminal and a complementary, terminal turning portion extending between both ends of said complementary, terminals longitudinal portion of said confronting terminal so as to turn around the axis of the pipe section, so that a longitudinal through-weld extends along the entire length of said metallic pipe, said longitudinal through-weld being constituted of said longitudinal welds of the pipe sections and a connecting longitudinal weld formed by the welding of said complementary, terminal longitudinal portions of the pipe sections, and so that a connecting turning weld formed by the welding of said complementary, terminal turning portions of the pipe sections extends between first and second different points on the longitudinal through-weld of said metallic pipe so as to turn around the axis of said metallic pipe along a peripheral wall of said metallic pipe, said first and second points being positioned at a distance which satisfies the following relationship:

$$0.15 \leq \frac{b'}{a'} \leq 4$$

wherein $a'$ represents the length of the circumference of the substantially circular cross-section of said metallic pipe and b, represents the distance between said first and second points on the longitudinal through-weld of said metallic pipe.

Referring now to FIG. 1, the composite overhead cable structure for electric and optical transmission according to the present invention, comprises metallic pipe 1 having a substantially circular cross-section taken along a line perpendicular to the axis of said pipe, at least one layer of stranded metallic elongated conductor 2 surrounding the outer periphery of said metallic pipe 1 in close contact with said outer periphery, and an optical fiber cable 3 disposed within and extending throughout the length of said metallic pipe 1.

Figure 4:
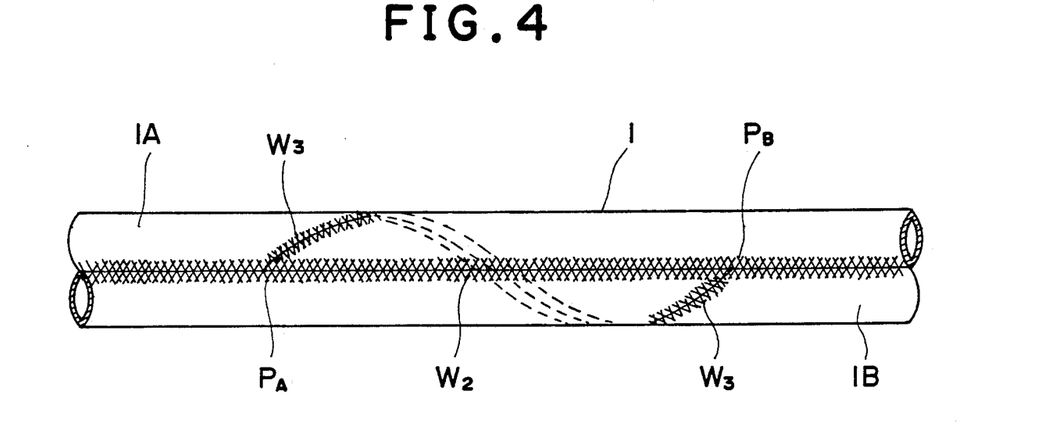
FIG. 4 is a partial diagrammatic view of one form of a welded metallic pipe to be employed in the composite overhead cable structure of the present invention.

In FIG. 4, there is shown a partial diagrammatic view of one form of a welded metallic pipe employed in the composite overhead cable structure of the present invention. Metallic pipe 1 has a substantially circular cross-section taken along a line perpendicular to the axis of said pipe. Metallic pipe 1 is made of a metal. Examples of suitable metals include aluminum, copper and steel. The metallic pipe comprises at least two metallic pipe sections 1A and 1B each having in its wall a longitudinal weld extending in a lengthwise direction of the pipe section. The metallic pipe sections 1A and 1B are arranged in alignment so that the longitudinal welds thereof are aligned. Pipe sections 1A and 1B which are disposed in adjacent relationship are connected at their respective confronting terminals having contours complementary to each other. Each confronting terminal of the pipe sections comprises a complementary, terminal longitudinal portion extending, in a lengthwise direction of the pipe section, from the terminal point of the longitudinal weld of the pipe section on the side of the confronting terminal (that is, each complementary, terminal longitudinal portion longitudinally extends between points $P_A$ and $P_B$) and a complementary, terminal turning portion extending between both ends ($P_A$ and $P_B$) of the complementary, terminal longitudinal portion of the confronting terminal so as to turn around the axis of the pipe section. In the metallic pipe to be used in the present invention, a longitudinal through-weld $W_2$ extends along the entire length of the metallic pipe 1. The longitudinal through-weld is constituted of the longitudinal welds of the pipe sections and a connecting longitudinal weld formed by the welding of the complementary, terminal longitudinal portions of the pipe sections. Further, this metallic pipe is unique in that a connecting turning weld $W_3$ formed by the welding of the complementary, terminal turning portions of the pipe sections 1A and 1B extends between first and second different points $P_A$ and $P_B$ on the longitudinal through-weld $W_2$ of the metallic pipe 1 so as to turn around the axis of the metallic pipe 1 along a peripheral wall of the metallic pipe 1. In the present invention, it is requisite that the first and second points ($P_A$ and $P_B$) be positioned at a distance which satisfies the following relationship:

$$0.15 \leq \frac{b'}{a'} \leq 4$$

wherein a' represents the length of the circumference of the substantially circular cross-section of metallic pipe 1 and b' represents the distance between the first and second points ($P_A$ and $P_B$) on the longitudinal through-weld $W_2$ of the metallic pipe 1.

In the above formula, the length of the circumference of the cross-section of a metallic pipe represented by numeral a' means a value as measured at the middle of the thickness of the pipe wall.

When the b'/a' ratio is smaller than 0.15, it is likely that the welded metallic pipe disadvantageously has weld defects, such as a gap in the longitudinal through-weld $W_2$, whereas when the b'/a' ratio is larger than 4, not only are sections to be cut away from the terminals of the original metallic tapes for producing terminal-cut metallic tapes to be fabricated into pipe sections disadvantageously large but also the length of weld $W_3$ is disadvantageously large.

There is no limitation with respect to the shape of connecting turning weld $W_3$ as long as the b'/a' ratio is in the above-mentioned range.

Figure 5:
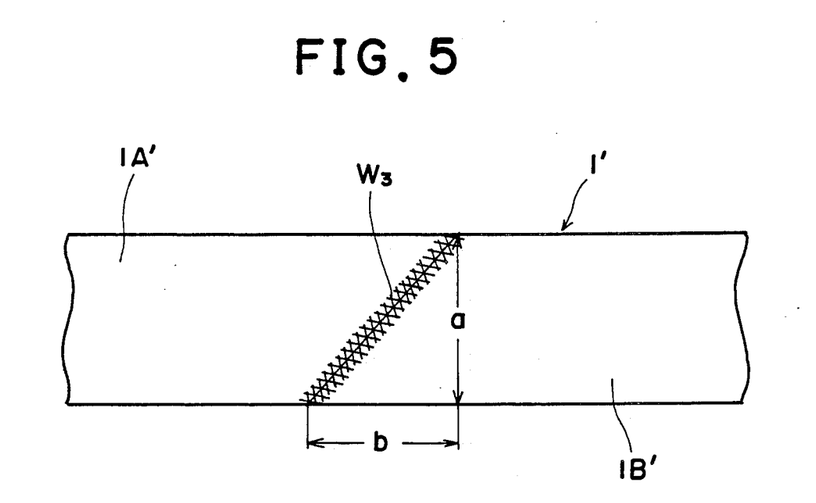
FIG. 5 is a partial diagrammatic view of one form of an extended metallic tape for forming the welded metallic pipe to be employed in the composite overhead cable structure of the present invention, illustrating one mode of welding employed in the present invention.

Metallic pipe 1 having a weld configuration shown in FIG. 4 is prepared from metallic tape 1' of FIG. 5.

Accordingly, in another aspect of the present invention, there is provided a process for producing a composite overhead cable structure, comprising the steps of:

(1) providing at least two metallic tapes having predetermined widths substantially identical to each other, each tape having a predetermined length and having opposite, first and second longitudinal side edges extending in parallel along the entire length of said tapes, at least one terminal of each of said at least two metallic tapes having a contour such that when the tapes are arranged in alignment, the contours of the respective confronting terminals of said tapes are complementary to each other, wherein each contour assumes a straight or curved line extending across said tape between a first point on said first side edge and a second point on said second side edge, said first and second points satisfy the following relationship:

$$0.15 \leq \frac{b}{a} \leq 4$$

wherein a represents the width of the tape and b represents the distance between said second point and a third point which is defined as an intersecting point of said second side edge of the tape and a straight line drawn across the tape from said first point in a direction vertical to said second side edge of the tape, (2) arranging said at least two metallic tapes so that one metallic tape abuts against the adjacent metallic tape at their respective confronting terminals having contours complementary to each other, (3) welding said metallic tapes at their abutting terminals to form a welded, extended tape, (4) bending said extended tape into a substantially cylindrical shape so that said first side edge of the extended tape meets said second side edge of the extended tape to form a substantially cylindrical preliminary pipe, while inserting an optical fiber cable into the substantially, cylindrical preliminary pipe being formed, (5) welding together said first and second side edges of said substantially cylindrical preliminary pipe to obtain a welded metallic pipe having the optical fiber disposed within and extending throughout the length of said welded metallic pipe, and (6) stranding a metallic elongated conductor around said welded metallic pipe.

In FIG. 5, there is shown a diagrammatic view of metallic tape 1' from which metallic pipe 1 of FIG. 4, which is one form of a metallic pipe employed in the composite overhead cable structure of the present invention, can be prepared. Metallic tape 1' is made of a metal. Examples of suitable metals include aluminum, copper and steel. In general, the thickness of the metallic tape is 0.8 to 2 mm.

Figure 6:
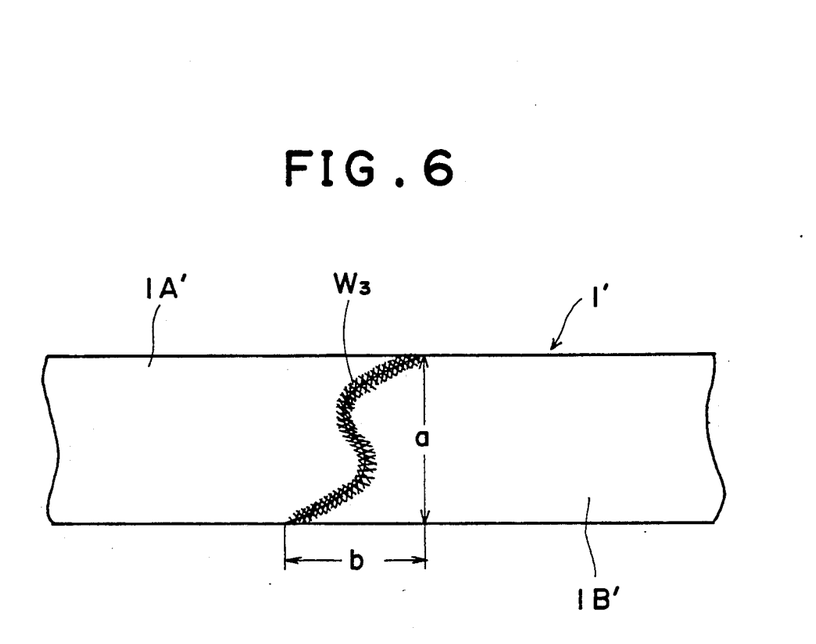
FIG. 6 is a partial diagrammatic view of another form of an extended metallic tape for forming the welded metallic pipe to be employed in the composite overhead cable structure of the present invention, illustrating another mode of welding employed in the present invention.

In the process of the present invention there is provided at least two metallic tapes 1A' and 1B' having predetermined widths substantially identical to each other. Each tape has a predetermined length and has opposite, first and second longitudinal side edges extending in parallel along the entire length of the tapes. At least one terminal of each of the metallic tapes 1A' and 1B' has a contour such that when the tapes are arranged in alignment, the contours of the respective confronting terminals of the tapes are complementary to each other. The contour of the confronting terminal assumes a straight line (as shown in FIG. 5) or a curved line (as shown in FIG. 6) extending across the tape between a first point (corresponding to Point $P_A$ or $P_B$) on the first side edge and a second point (corresponding to point $P_B$ when the first point is $P_A$ or point $P_A$ when the first point is $P_B$) on the second side edge. In the present invention, it is requisite that the first and second points satisfy the following relationship:

$$0.15 \leq \frac{b}{a} \leq 4$$

wherein a represents the width of the tape and b represents the distance between the second point and a third point which is defined as an intersecting point of the second side edge of the tape and a straight line drawn across the tape from the first point in a direction vertical to the second side edge of the tape.

If the b/a ratio is smaller than 0.15, both end portions (first and second points) of weld $W_3$ are caused to be too near when metallic tape 1' is bent into a substantially cylindrical shape, thereby making it likely that defective welding occurs at the time of welding together both the longitudinal side edges of the cylindrically bent tape, whereas if the b/a ratio is larger than 4, not only are the portions of the metallic tapes which are cut away to prepare tapes having respective confronting terminals complementary to each other, disadvantageously large, but also the length of weld $W_3$ (i.e., the length to be welded) is disadvantageously large, both of which are undesirable from the viewpoint of economy and ease in welding operation. Further, when the b/a ratio is larger than 4, the length of the blade to be used for cutting to prepare complementary confronting terminals is necessarily disadvantageously large. There is no limitation with respect to the contours of the confronting terminals as long as the b/a ratio is in the above-mentioned range. Therefore, the contours are not necessarily a straight line as indicated in FIG. 5, but may be a curved line as indicated in FIG. 6. In the case where the contours are a straight line as shown in FIG. 5, the final metallic pipe has connecting turning weld $W_3$ which extends helically around the axis of the metallic pipe as shown in FIG. 4.

The above-mentioned relationship between the first point on the first side edge and the second point on the second side edge may alternatively be defined by the angle (acute) of a line drawn between the first and second points relative to the second side edge of the tape. According to this system of definition, the angle is in the range of from about 14° to about 81.5°. When the contours of the confronting terminals of the tapes are a straight line as shown in FIG. 5, the straight line between the first and second points constitutes the contour of each of the confronting terminals (the line corresponds to weld $W_3$ of FIG. 5).

The thus prepared terminal-cut metallic tapes are arranged so that one metallic tape abuts against the adjacent metallic tape at their respective confronting terminals having contours complementary to each other, and the metallic tapes are welded at their abutting terminals to form a welded, extended tape.

Welding of the abutting terminals of the metallic tapes can be performed by any conventional welding method. Examples of suitable welding methods include electric arc welding, resistance welding, plasma arc welding, explosion welding, pressure welding, ultrasonic welding and laser beam welding.

Extended tape 1' prepared in the above-mentioned manner is bent into a substantially cylindrical shape so that one side edge (first side edge) of the extended tape meets the opposite side edge (second side edge) of the extended tape to form a substantially cylindrical preliminary pipe, while inserting an optical fiber cable into a substantially cylindrically bent tape (preliminary pipe) being formed. Then, the first and second side edges of the substantially cylindrical preliminary pipe are welded together, forming throughweld $W_2$ extending throughout the entire length thereof, to thereby obtain a welded metallic pipe having the optical fiber cable disposed within and extending throughout the length of the welded metallic pipe. The welding of the first and second side edges of the preliminary pipe can be performed by any conventional welding technique. Subsequently, a metallic elongated conductor is stranded around the welded metallic pipe.

Figure 7:
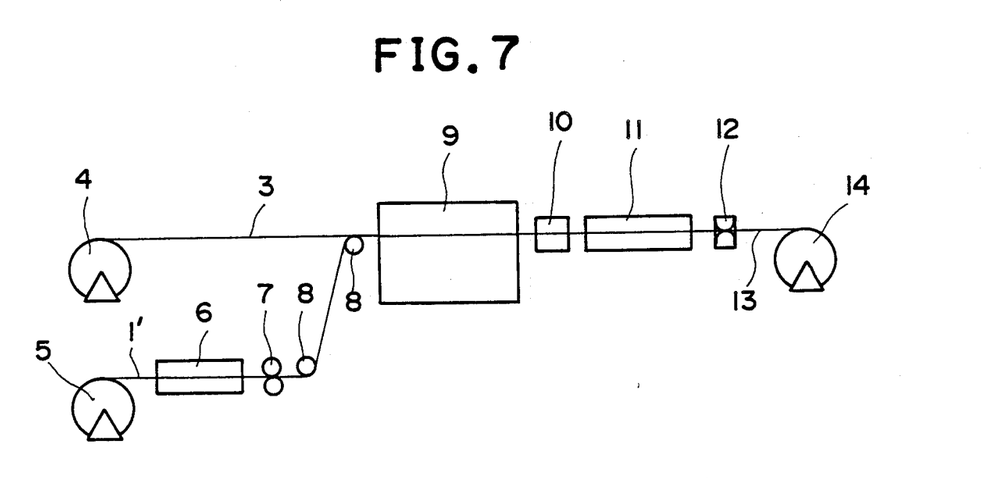
FIG. 7 is a diagrammatic view illustrating one form of an apparatus for producing a welded metallic pipe having disposed therein an optical fiber cable, which apparatus may be used in the process of the present invention.

Referring now to FIG. 7, there is shown one form of an apparatus for preparing a welded metallic pipe having disposed therein an optical fiber cable, which apparatus may be used in the method of the present invention. Optical fiber cable 3 is supplied from optical fiber cable supply 4. Extended metallic tape 1' is supplied from metallic-tape supply 5 (metallic-tape pad), washed in tape washer 6, and then cut at both of opposite longitudinal sides thereof by means of tape slitter 7 to form a metallic tape having a predetermined width, which is then led by guide rolls 8 to receive thereon optical fiber cable 3 supplied from optical fiber cable supply 4. Metallic tape 1' is bent into a substantially cylindrical shape so that opposite longitudinal side edges abut each other in zone 9 to form a substantially cylindrical preliminary pipe, while including optical fiber cable 3 within the inside of the preliminary pipe being formed. Then, the resultant preliminary pipe has its longitudinal side edges (which are in close contact) welded together along the entire length thereof in zone 10, followed by cooling by cooling machine 11. The resultant welded metallic pipe having housed therein optical fiber cable 3 is passed through die 12. By the passage through die 12, metallic pipe is elongated while reducing the diameter of the pipe and, at the same time, increasing the wall thickness of the pipe by about 0.03 mm. The resultant final welded metallic pipe 13 having housed therein optical fiber cable 3 is taken up by reel 14.

Figure 8:
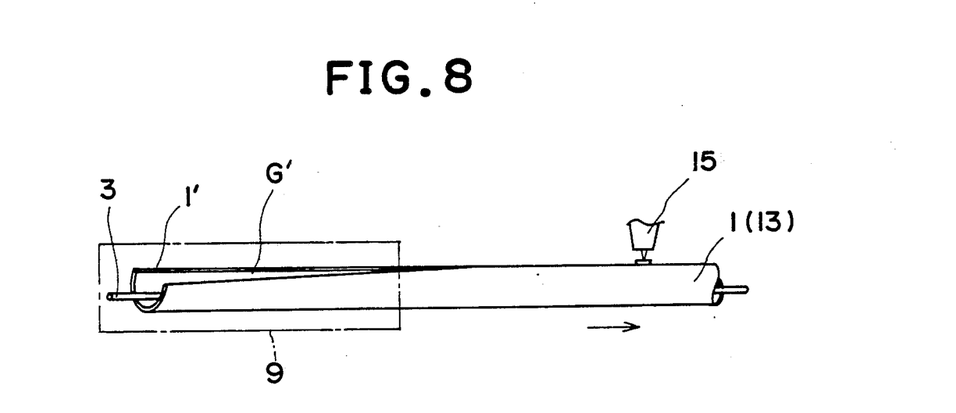
FIG. 8 is an enlarged diagrammatic view of a portion of the apparatus of FIG. 7.

In FIG. 8, there is shown an enlarged diagrammatic view of a portion of the apparatus of FIG. 7 which portion includes zone 9 of FIG. 7. As mentioned above, in zone 9, metallic tape 1' is bent into a substantially cylindrical shape while including therein optical fiber cable 3. Gap G, between the opposite longitudinal side edges of metallic tape 1' is closed as the bending of metallic tape 1' into a substantially cylindrical shape is completed, so that both the opposite longitudinal side edges are brought into close contact with each other. Then, the cylindrically shaped metallic tape 1' (preliminary pipe) is welded together at the longitudinal side edges thereof by welding machine 15 to provide welded metallic pipe 1(13) having housed therein optical fiber cable 3, as is described with reference to FIG. 9.

Figure 9:
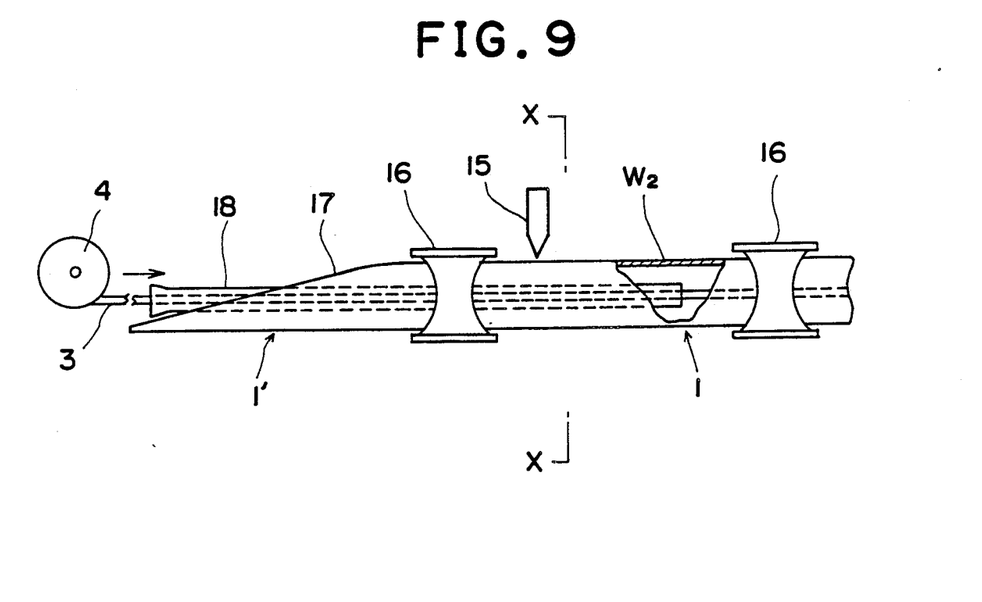
FIG. 9 is an enlarged diagrammatic view of another portion of the apparatus of FIG. 7.

In FIG. 9, there is shown an enlarged diagrammatic view of another portion of the apparatus of FIG. 7 which portion includes zone 10 of FIG. 7. Longitudinal side edges 17 of cylindrically shaped metallic tape 1' (preliminary pipe), the edges being in abutment, are welded together to form through-weld $W_2$ along the entire length of metallic pipe 1. Squeeze rolls 16 serve to secure cylindrically shaped metallic tape 1' (preliminary pipe) so that longitudinal side edges 17 of the preliminary pipe are in good contact with each other during the time when the welding of side edges 17 to form through-weld $W_2$, is conducted. Optical fiber cable 3 supplied from optical fiber cable supply 4 may optionally be covered with protective sheath 18.

Figure 10:
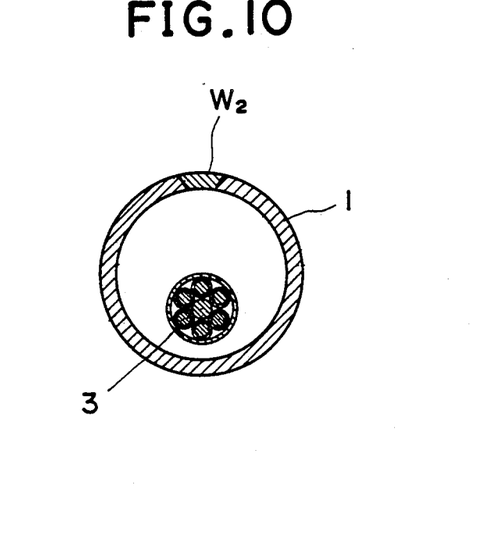
FIG. 10 is an enlarged diagrammatic cross-sectional view of FIG. 9, taken along line X—X, illustrating the cross-section of the welded metallic pipe having disposed therein an optical fiber cable, the metallic pipe being produced.

In FIG. 10, there is shown a cross-sectional view of FIG. 9, taken along line X—X of FIG. 9, with protective sheath 18 omitted. Metallic pipe 1 has a substantially circular cross-section and contains optical fiber cable 3, and has through-weld $W_2$ along the entire length thereof.

Subsequently, an elongated element made of metal such as aluminum, copper and steel and having a circular or polygonal shape in cross-section is fittedly stranded around the outer periphery of the above-obtained welded metallic pipe 1 having disposed therein optical fiber cable 3, to provide at least one layer of stranded metallic elongated conductor as indicated by numeral 2 in FIG. 1, thereby obtaining a composite overhead cable structure having a cross-section shown in FIG. 1.

In a further aspect of the present invention, there is provided an optical fiber cable-containing metallic pipe for use in optical transmission, comprising:

a metallic pipe having a substantially circular cross-section taken along a line perpendicular to the axis of said pipe, and an optical fiber cable disposed within and extending throughout the length of said metallic pipe, said metallic pipe comprising at least two metallic pipe sections each having in its wall a longitudinal weld extending in a lengthwise direction of the pipe section, said at least two metallic pipe sections being arranged in alignment so that the longitudinal welds thereof are aligned, the pipe sections which are disposed in adjacent relationship being connected at their respective confronting terminals having contours complementary to each other, wherein each confronting terminal comprises a complementary, terminal longitudinal portion extending, in a lengthwise direction of the pipe section, from the terminal point of said longitudinal weld of the pipe section on the side of said confronting terminal and a complementary, terminal turning portion extending between both ends of said complementary, terminal longitudinal portion of said confronting terminal so as to turn around the axis of the pipe section, so that a longitudinal through-weld extends along the entire length of said metallic pipe, said longitudinal through-weld being constituted of said longitudinal welds of the pipe sections and a connecting longitudinal weld formed by the welding of said complementary, terminal longitudinal portions of the pipe sections, and so that a connecting turning weld formed by the welding of said complementary, terminal turning portions of the pipe sections extends between first and second different points on the longitudinal through-weld of said metallic pipe so as to turn around the axis of said metallic pipe along a peripheral wall of said metallic pipe, said first and second points being positioned at a distance which satisfies the following relationship:

$$0.15 \leq \frac{b'}{a'} \leq 4$$

wherein a' represents the length of the circumference of the substantially circular cross-section of said metallic pipe and b' represents the distance between said first and second points on the longitudinal through-weld of said metallic pipe.

As described above, according to the present invention, the welded metallic pipe comprises at least two metallic pipe sections which are arranged in alignment and connected at their respective confronting terminals having contours complementary to each other, wherein the metallic pipe has a specific structure of connection such that a longitudinal through-weld extends along the entire length of the metallic pipe and such that a connecting turning weld extends between first and second different points on the longitudinal through-weld of the metallic pipe so as to turn around the axis of the metallic pipe, the first and second points being positioned at a distance which satisfies a specific relationship. Such a welded metallic pipe has no weld defects such as a gap in the longitudinal through-weld thereof but has a fluid-tight wall structure, thereby enabling the metallic pipe to be free from the danger that rain water or the like permeates the pipe and adversely affects the optical fiber cable disposed therein.

The composite overhead cable structure of the present invention, having incorporated therein the above-mentioned metallic pipe which is free from weld defects and hence has a fluid-tight wall structure, satisfies the demand for large length composite overhead cables, without the danger that rain water or the like can enter the welded metallic pipe through a gap and adversely affect an optical fiber cable housed therein, so that not only can a lowering of the transmission properties of the optical fibers be prevented but also an expensive optical fiber cable is not damaged. As mentioned above, according to the present invention, a welded metallic pipe having a length of 6 km or more can be produced without the danger of occurrence of defective welding, as compared to the case of the production of the conventional welded metallic pipe in which the longitudinal through-weld crosses the turning weld connecting the mutually adjacent pipe sections with right angles to each other. According to the present invention, even when the desired length of the composite overhead cable structure is 4 km or less, a composite overhead cable structure having no weld defects in the metallic pipe contained therein, can advantageously be produced by employing a specific structure of connection between the mutually adjacent pipe sections as defined in the present invention.

The present invention will be described with reference to the following preferred embodiment, which should not be construed as limiting the scope of the present invention.

One terminal of a metallic tape made of aluminum having a thickness of 1.1 mm and a width of 75 mm and one terminal of another metallic tape made of aluminum having a thickness of 1.1 mm and a width of 75 mm were straightly cut so that when the tapes are arranged in alignment, the straight line contours of the respective confronting terminals of the tapes are complementary to each other. The b/a ratio (shown in FIG. 5) of each of the tapes was varied as indicated in Table 1. The two metallic tapes were arranged so that one metallic tape abuts against the other adjacent metallic tape at their respective confronting terminals having straight line contours complementary to each other. These metallic tapes were welded by TIG (tungsten inert gas) welding at their abutting terminals to form a welded, extended tape. The resultant extended tape was bent into a substantially cylindrical shape so that one side edge of the extended tape meets the opposite side edge of the extended tape to form a substantially cylindrical preliminary pipe. Subsequently, both side edges of the substantially cylindrical preliminary pipe were seam welded together, thereby obtaining a welded metallic pipe.

With respect to each of the various types of metallic pipes having b/a ratios varied, ten samples were produced and examined on the ratio of occurrence of defective welding (gaps) in the weld extending along the length of each pipe. The results are shown Table 1. As apparent from Table 1, when the b/a ratio is smaller than 0.15 which is the lower limit of the present invention, occurrence of defective welding is observed.

TABLE 1

| $\frac{b}{a}$ ratio | Ratio of occurrence of defective welding |
|---|---|
| 11.42 | 0/10 |
| 5.67 | 0/10 |
| 2.74 | 0/10 |
| 1.73 | 0/10 |
| 1.19 | 0/10 |
| 0.83 | 0/10 |
| 0.57 | 0/10 |
| 0.36 | 0/10 |
| 0.17 | 0/10 |
| 0.13 | 1/10 |
| 0.05 | 5/10 |
| 0 | 10/10 |

What is claimed is:

1. A composite overhead cable structure for electric and optical transmission, comprising:
   a metallic pipe having a substantially circular cross-section taken along a line perpendicular to the axis of said pipe,
   at least one layer of stranded metallic elongated conductor surrounding the outer periphery of said metallic pipe in close contact with said outer periphery, and
   an optical fiber cable disposed within and extending throughout the length of said metallic pipe,
   said metallic pipe comprising at least two metallic pipe sections each having in its wall a longitudinal weld extending in a lengthwise direction of the pipe section, said at least two metallic pipe sections being arranged in alignment so that the longitudinal welds thereof are aligned,
   the pipe sections which are disposed in adjacent relationship being connected at their respective confronting terminals having contours complementary to each other, wherein each confronting terminal comprises a complementary, terminal longitudinal portion extending, in a lengthwise direction of the pipe section, from the terminal point of said longitudinal weld of the pipe section on the side of said confronting terminal and a complementary, terminal turning portion extending between both ends of said complementary, terminal longitudinal portion of said confronting terminal so as to turn around the axis of the pipe section, so that a longitudinal through-weld extends along the entire length of said metallic pipe, said longitudinal through-weld being constituted of said longitudinal welds of the pipe sections and a connecting longitudinal weld formed by the welding of said complementary, terminal longitudinal portions of the pipe sections, and so that a connecting turning weld formed by the welding of said complementary, terminal turning portions of the pipe sections extends between first and second different points on the longitudinal through-weld of said metallic pipe so as to turn around the axis of said metallic pipe along a peripheral wall of said metallic pipe,
   said first and second points being positioned at a distance which satisfies the following relationship:

$$0.15 \leq \frac{b'}{a'} \leq 4$$

wherein a' represents the length of the circumference of the substantially circular cross-section of said metallic pipe and b' represents the distance between said first and second points on the longitudinal through-weld of said metallic pipe.

2. A composite overhead cable structure according to claim 1, wherein said connecting turning weld extends helically around the axis of the metallic pipe.

3. A process for producing a composite overhead cable structure, comprising the steps of:
   (1) providing at least two metallic tapes having predetermined widths substantially identical to each other, each tape having a predetermined length and having opposite, first and second longitudinal side edges extending in parallel along the entire length of said tapes,
   at least one terminal of each of said at least two metallic tapes having a contour such that when the tapes are arranged in alignment, the contours of the respective confronting terminals of said tapes are complementary to each other, wherein each contour assumes a straight or curved line extending across said tape between a first point on said first side edge and a second point on said second side edge, said first and second points satisfy the following relationship:

$$0.15 \leq \frac{b}{a} \leq 4$$

wherein a represents the width of the tape and b represents the distance between said second point and a third point which is defined as an intersecting point of said second side edge of the tape and a straight line drawn across the tape from said first point in a direction vertical to said second side edge of the tape,
   (2) arranging said at least two metallic tapes so that one metallic tape abuts against the adjacent metallic tape at their respective confronting terminals having contours complementary to each other, (3) welding said metallic tapes at their abutting terminals to form a welded, extended tape,
(4) bending said extended tape into a substantially cylindrical shape so that said first side edge of the extended tape meets said second side edge of the extended tape to form a substantially cylindrical preliminary pipe, while inserting an optical fiber cable into the substantially cylindrical preliminary pipe being formed,
(5) welding together said first and second side edges of said substantially cylindrical preliminary pipe to obtain a welded metallic pipe having the optical fiber cable disposed within and extending throughout the length of said welded metallic pipe, and
(6) stranding a metallic elongated conductor around said welded metallic pipe.

4. A process according to claim 3, wherein said contour of the confronting terminals of the metallic tape assumes a straight line.

5. An optical fiber cable-containing metallic pipe for use in optical transmission, comprising:
a metallic pipe having a substantially circular cross-section taken along a line perpendicular to the axis of said pipe, and
an optical fiber cable disposed within and extending throughout the length of said metallic pipe,
said metallic pipe comprising at least two metallic pipe sections each having in its wall a longitudinal weld extending in a lengthwise direction of the pipe section, said at least two metallic pipe sections being arranged in alignment so that the longitudinal welds thereof are aligned,
the pipe sections which are disposed in adjacent relationship being connected at their respective confronting terminals having contours complementary to each other, wherein each confronting terminal comprises a complementary, terminal longitudinal portion extending, in a lengthwise direction of the pipe section, from the terminal point of said longitudinal weld of the pipe section on the side of said confronting terminal and a complementary, terminal turning portion extending between both ends of said complementary, terminal longitudinal portion of said confronting terminal so as to turn around the axis of the pipe section, so that a longitudinal through-weld extends along the entire length of said metallic pipe, said longitudinal through-weld being constituted of said longitudinal welds of the pipe sections and a connecting longitudinal weld formed by the welding of said complementary, terminal longitudinal portions of the pipe sections, and so that a connecting turning weld formed by the welding of said complementary, terminal turning portions of the pipe sections extends between first and second different points on the longitudinal through-weld of said metallic pipe so as to turn around the axis of said metallic pipe along a peripheral wall of said metallic pipe,
said first and second points being positioned at a distance which satisfies the following relationship:

$$0.15 \leq \frac{b'}{a'} \leq 4$$

wherein $a'$ represents the length of the circumference of the substantially circular cross-section of said metallic pipe and $b'$ represents the distance between said first and second points on the longitudinal through-weld of said metallic pipe.

6. A metallic pipe according to claim 5, wherein said connecting turning weld extends helically around the axis of the metallic pipe.

* * * * *